United States Patent

[11] 3,599,901

| [72] | Inventor | Allan J. Relkin |
| | | 279 4th Ave., East Orange, N.J. 07017 |
| [21] | Appl. No. | 819,384 |
| [22] | Filed | Apr. 25, 1969 |
| [45] | Patented | Aug. 17, 1971 |

[54] VEHICLE ADAPTED TO LAND AND AIR TRAVEL
21 Claims, 5 Drawing Figs.

[52] U.S. Cl. .................................................. 244/12 B, 244/2
[51] Int. Cl. .................................................. B64c 29/00
[50] Field of Search .......................................... 244/25, 29, 9, 12, 23

[56] References Cited
UNITED STATES PATENTS

| 3,107,071 | 10/1963 | Wessels | |
| 3,207,245 | 9/1965 | Weiland | 244/23 |
| 1,457,024 | 5/1923 | Franzen | 244/23 |
| 1,766,358 | 6/1930 | Rose | 244/29 |
| 1,986,064 | 1/1935 | Leray | 244/29 |
| 2,334,286 | 11/1943 | Quickel | 244/25 |
| 3,454,238 | 7/1969 | Goodson | 244/9 |
| | | | 244/12 |

Primary Examiner—Milton Buchler
Assistant Examiner—Steven W. Weinrieb
Attorney—Bauer and Goodman

ABSTRACT: A vehicle adapted for land and air travel comprising, a fuselage having a longitudinal duct therein, means within said longitudinal duct for creating an airstream therethrough, a vertical duct extending about said first duct and fan means mounted within the vertical duct having actuating means located within said longitudinal duct and operable by said air stream therein for causing a flow of air from the upper surface of said fuselage through said vertical duct to be expelled from an exit in the lower surface of the fuselage.

PATENTED AUG 17 1971 3,599,901

INVENTOR.
ALLAN J. RELKIN
BY
ATTORNEYS

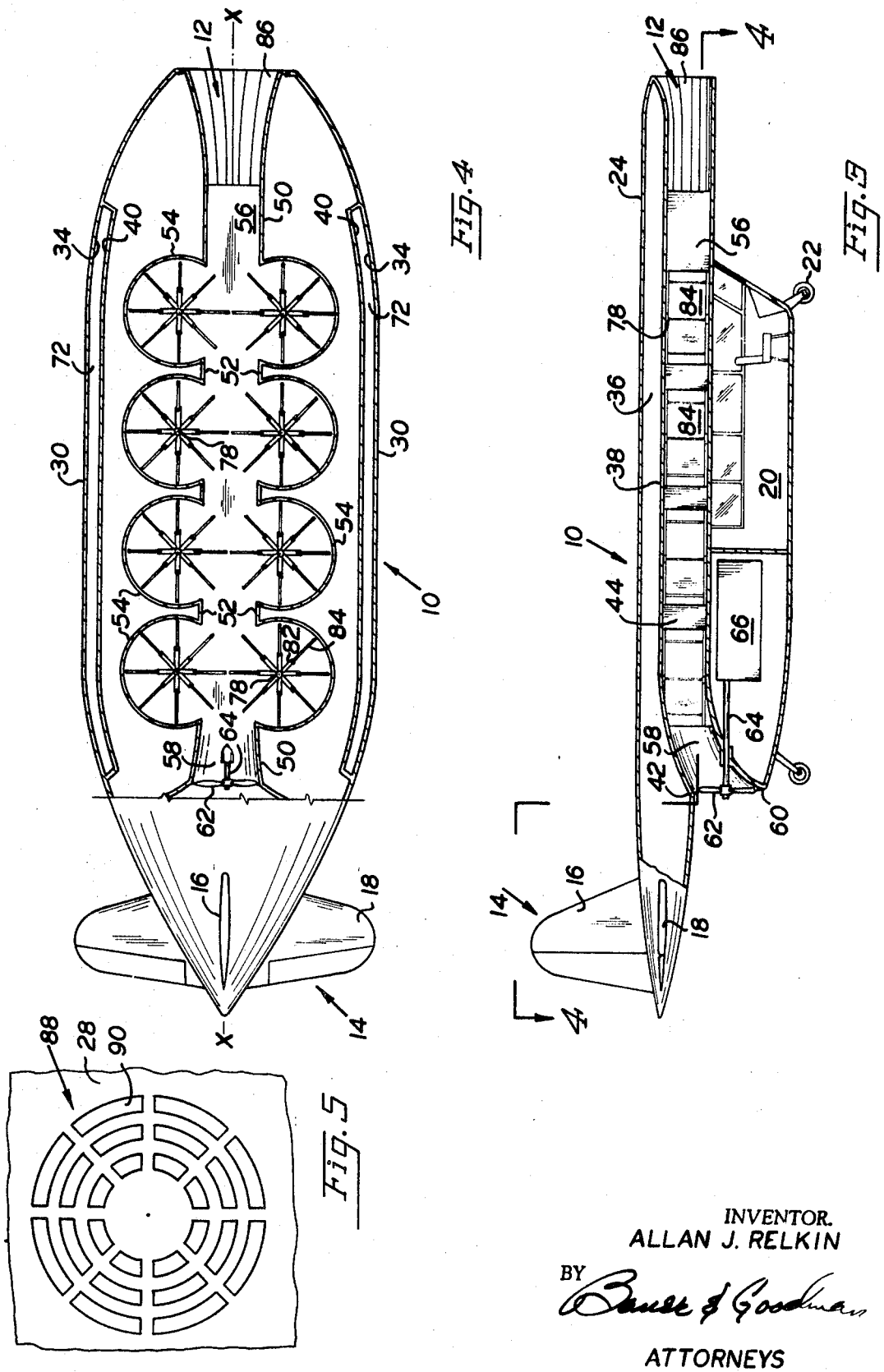

VEHICLE ADAPTED TO LAND AND AIR TRAVEL

The present invention relates to an improved vehicle adaptable for alternative use as an aircraft and as a road vehicle.

One of the objects of the present invention is the provision of a vehicle which may be used in the air and/or on the ground with virtually no structural or functional change required to do so. Prior art vehicles of this type, and there have been many, generally employ aircraft structure as their primary design. Wings, fixed or movable, helicopter rotors, and/or jet or propeller power means, are common features of such vehicles. Consequently, versatility as a ground vehicle is severely restricted and true over the road operation is often impossible without first radically "converting" the structure of the vehicle. The present invention provides a streamlined structure devoid of major appendages, propellers, rotors, etc., and generally of a more roadlike design than heretofore.

Another object of the present invention is the provision of a vehicle in which the power source is the same for both land and air travel. The prior art vehicles, to sustain flight, employed engines which were too large and powerful for ordinary land operation and consequently complex reduction gearing or secondary engines were required. The present invention provides a vehicle employing a single source of power for both flight and ground operation.

Still another object of this invention is to provide an air vehicle having improved flight characteristics virtually eliminating free-fall and accidental crash. The heavier than air vehicles of the prior art, by and large, had poor glide phenomena as well as the aforementioned poor sustained lift quality. As a consequence, in the event power was lost, the vehicle was rarely able to glide to a safe landing. It is an object of the present invention to provide a vehicle having sustained lift and high glide phenomena, even with a total loss of power to thus eliminate any hazard or crash characteristics.

It is another object of the present invention to provide a vehicle easily maneuverable on the ground. The fixed wing or rotor-driven vehicle of the prior art required a great deal of space to turn or reverse the direction. This invention provides a vehicle which has a small turn radius and one which is easily maneuverable in much the same manner as a standard automobile.

These objects, as well as others, together with the numerous advantages of the present invention, will be apparent from the following description. Briefly, however, the present invention provides a wingless fuselage having a generally elongated balloonlike body which comprises the lift or aerodynamic surface. Motive power is derived from a motor-driven propeller which draws air longitudinally through the fuselage to exit through the rear and which activates a plurality of vertically disposed freely rotatable turbine fans providing lift by sucking air from the top surface of the body downwardly therethrough within a particularly arranged duct network to exit providing upward lift power.

In the description, reference is made to the attached drawings in which:

FIG. 3 is a partial sectional view taken in a plane horizontal through the axis of the vehicle of Fig. 1;

FIG. 4 is a side section taken in a plane vertically through the longitudinal axis of the vehicle of Fig. 1;

FIG. 5 is a view of the grillwork employed in the vehicle shown in Fig. 1.

Figure 1:
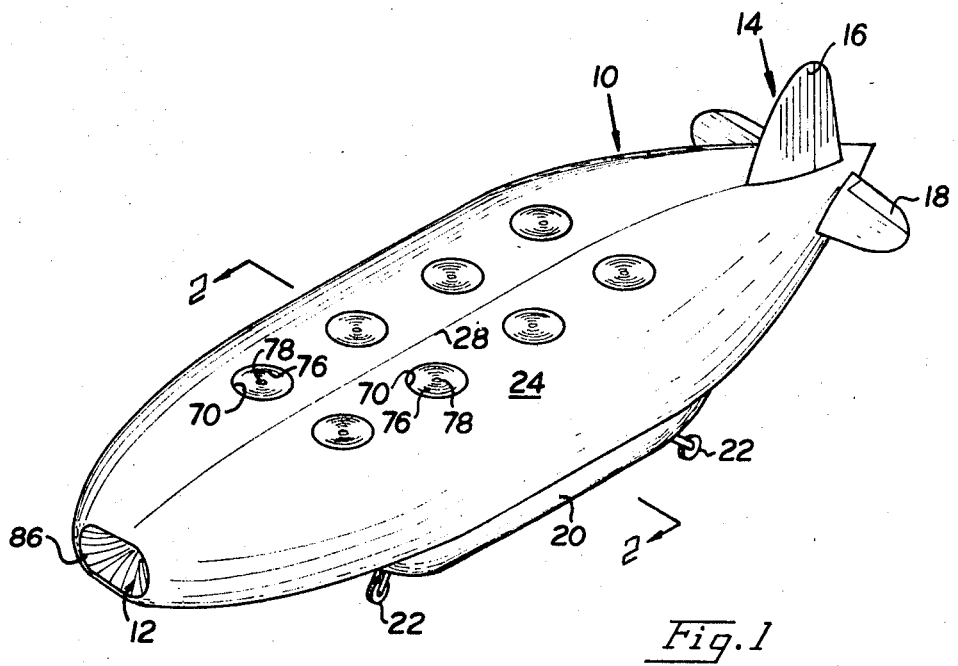
FIG. 1 is a perspective view of the exterior of the vehicle according to the present invention.

Externally the vehicle appears as a tapered elongated balloonlike fuselage 10 having at its front end an orifice 12 and at its rear end a tail section 14 provided with a rudder 16 and elevator assembly 18. Suspended from the lower surface of the fuselage 10 is a cabin 20 wherein is located conventional facilities such as the control cockpit and passenger seats and to which a plurality of wheels 22 are mounted. It is preferred that the forward wheel or wheels be controllable, thereby enabling operation by conventional steering mechanism. In the following description, little detail will be given of the cabin and cockpit facilities since per se they actually form no part of the present invention. Cabin and cockpit facilities, as well as detail control apparatus, are too numerous and too easily available that they will be apparent and readily employable by those in the art.

Figure 2:
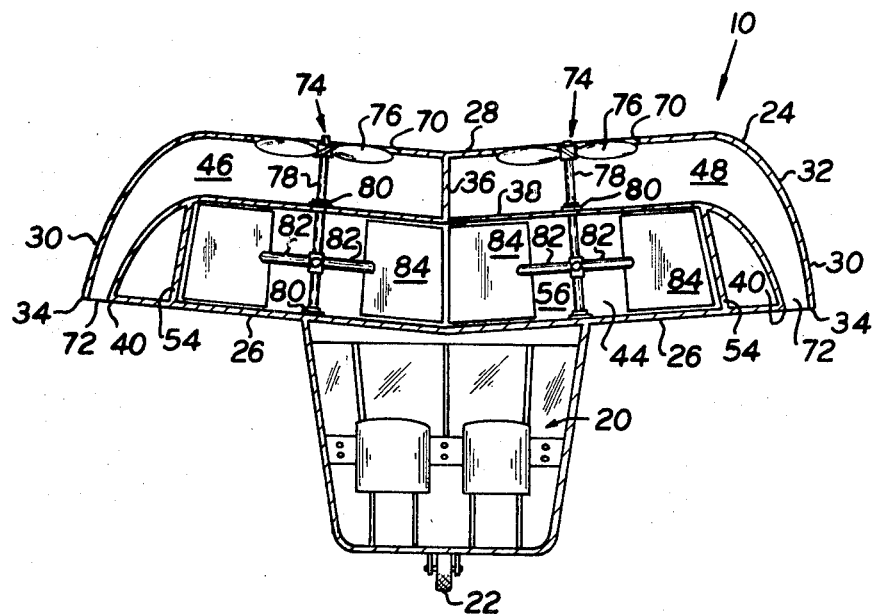
FIG. 2 is a transverse vertical section of the vehicle shown in Fig. 1, taken along lines 2—2.

The fuselage 10 is of two-part construction comprising a shaped upper foil member 24 and a substantially flat lower foil member 26 substantially horizontal parallel planes which, together, form a hollow plenum. The upper foil member 24 is curved, elongated and tapered to assume a substantially transcendental ellipsoidal figure, having a flat central longitudinal portion 28 and a peripheral depending skirt 30 joined thereto by a continuous rounded corner 32. The depending skirt 30 terminates in a substantially coplanar edge 34 to which the edge of the flat lower foil member 26 is joined. Mounted along the center of the upper foil member 24 and depending into the interior of the fuselage 10 is a bulkhead 36 which forms the backbone of the vehicle and its axis of symmetry. It is preferred that the fuselage 10 be provided with a slight dihedral angle, as seen in Fig. 2, to provide a winglike surface for stability and maneuverability.

Within the interior of the fuselage 10 and mounted between the lower edge of the bulkhead 36, and the lower foil member 26, is a curved partition 38 having a peripheral edge 40 joined to the interior surface of the lower foil member 26. The curved partition 38 in both transverse cross section (FIG. 2) and longitudinal cross section (FIG. 3) is generally similar to that of the upper foil member 24, except that in longitudinal cross section, it is curved upwardly at its forward end and downwardly at its rear end so as to join the upper foil member at the orifice 12 and the lower foil member at a point 42 between the cabin 20 and the tail section 14. The partition 38 consequently divides the interior of the fuselage 10 longitudinally into a lower chamber 44 and a pair of upper chambers 46 and 48 which additionally laterally curves around the lower chamber.

The lower chamber 44 is provided with a pair of opposed vertical wall sections 50 extending between the interior surfaces of the foil members 24 and 26. The wall sections 50 have a series of arcuate bulges 52 uniformly arranged in opposed pairs with the axis of symmetry X between them to provide a plurality of substantially circular wells 54 within the fuselage 10. As seen in FIG. 3, the forward and rear edges of the wall sections 50 are joined to the depending skirt 30 at the orifice 12 and the tail 14 at point 42, thereby creating a longitudinal duct 56 through the central portion of the chamber 44. The duct 56 is provided with an opening 58 through the underfoil member 26, to the rear of the cabin 20 and adjacent the point 42, thus permitting the movement of an airstream through the duct from the orifice 12 rearward to the tail of the fuselage. The cabin 20 is preferably provided with a curved rear roof portion 60 so as to elongate the duct configuration and insure that the flow of air exits completely from the fuselage 10.

Located within the opening 58 is a propeller 62 connected by an elongated shaft 64 to a suitable motor 66 contained in the cabin compartment 20. The motor 66 may be of the gasoline or diesel type. The propeller may be replaced with a turbine or even jet engine to provide the airflow desired. In any event, the propeller motor is preferably arranged with suitable controls and throttling means to rotate in a generally vertical plane to cause a primary stream of a substantial amount of air to flow at a generally low velocity into the chamber 44. The motor 66 or propeller 62 should also be reversible to provide a flow as desired from front to rear or vice versa. It will be obvious that the former flow will move the craft forward while the latter flow will cause the craft to move backward.

The two upper chambers 46 and 48 are also converted into air ducts by providing a row of circular holes 70 (FIG. 1) in the flat section 28 of the upper foil member 24 to either side of the central bulkhead 38 and by providing a longitudinal slot 72 (FIG. 4) in the lower foil member 26 between the corresponding edges 34 and 40 of the upper foil member 24 and the partition 38, respectively. The circular holes 70 are aligned with and corresponding to the circular wells 54 formed by the bulges 52 in wall sections 50. The slots 72 extend peripherally inboard of the lower foil 26 (Fig. 4) substantially from a point rear of the orifice 12 to a point short of the rear opening 58 so that the flow of air is permitted substantially vertically through the fuselage 10 and laterally around the lower chamber 44.

Located within each of the wells 54 is a turbine assembly 74 comprising a fan 76 mounted for rotation in a generally horizontal plane on a freely rotatable shaft 78. The fans 76 comprise a plurality of blades, the number, size and pitch of which are selected to provide for the suction of the desired volume of air into the chambers 46 and 48 from the outer surface of the upper foil member 24. Each shaft 78 is journaled within suitable bearings 80 in the partition 38 and on the inner surface of the lower foil member 26 and has extending radially therefrom below the partition 38 impeller means comprising a plurality of arms 82 to which are attached substantially rectangular paddles 84 adapted to project into the airstream flowing through duct 56. On drawing air through the orifice 12 into the chamber duct 44, the paddles 84 are caused to move, rotating the fans 76 which consequently cause air to be sucked into the duct chambers 46 and 48 to be then expelled downwardly through the longitudinal peripheral slot 72 providing the vertical reaction lift sustaining the vehicle in flight. On the rear to front flow of air through chamber 44, as in reverse ground operation, the fans 76 rotate to expel air upwardly from the circular openings, thereby causing no lift.

It will be seen that each of the turbine assemblies 74 are independently mounted and are separate in construction and operation from any of the others. Consequently, the inaction or loss of any one or more of the assemblies will only partially affect the operation of the vehicle. The air expelled through slot 72 is of course the sum of all air taken into the chambers 46 and 48 and even distribution along the periphery of the fuselage is always the resultant. The even distribution avoids the placing of stress or uneven force such as tilting, yawing or other undesirable motion in the vehicle. The number and deployment of the turbine assemblies 74 is consequently not critical and while eight are shown, less may be employed. Further more, they need not be provided in two rows but may be in a single row or staggered, with resultant obvious changes in the structure of the fuselage. In any event, a uniform flow of air laterally inboard of the fuselage and downwardly through the peripheral slot 72 is the important factor.

To increase the velocity of the airstream through the duct 56, the vertical walls 50 are narrowed to converge (FIG. 4) adjacent each of the turbine assemblies to provide a venturi effect as the air contacts the paddles 84. In this manner, the large volume, low velocity, intake is converted into a many multiplied force to power the turbine assemblies. Further, regulation over the volume and velocity of the airstream is effected by providing the front orifice 12 with a shutter or iris mechanism 86 which can be controlled by conventional mechanisms (not shown) from the cockpit. The shutter 86 may be made to open or close the orifice 12 to the desired degree to control the amount of air entering the duct 56.

To facilitate the vertical flow of air through chambers 46 and 48, and to increase the speed of air exiting from the longitudinal slot 72, the corresponding depending peripheral sides of the upper wall member 24 and the partition 38 can be made (as seen in FIG. 2) to converge so as to restrict the slot 72 with respect to the remainder of the chamber to provide, here also, a venturilike opening. Likewise, the rear exit opening 58 may also be restricted by converging its upper wall with respect to the curved top 60 of the cabin to provide increased venturilike flow of air. In operation, flight is caused by providing power through motor 66 to the propeller 62. For flight, the shutter 86 is opened sufficiently to provide a volume of air sufficient to rotate the paddles 84 at a high speed. During flight, of course, the propeller 62 is activated to move air from front to rear within duct 56 since reverse travel of an aircraft should only be caused by turning the entire vehicle itself. The air stream is ejected out of exit 58 and provides the sole forward propulsion component of flight. Meanwhile, the turning of the paddles 84 rotate each of the fans 76 which thereupon suck air from the upper surface of foil 24. The air then passes into the upper duct chambers 46 and 48, from which it is ejected downwardly out of the fuselage 10 through the longitudinal slots 72. The force of the air ejected through the slots 72 creates a "reaction" producing the upward or vertical lift component of flight. The forward and vertical components, when combined, will provide the sustained flight characteristics of this vehicle. The dihedral configuration of the fuselage 10 also acts to increase the lift of the vehicle when it is caused to move forwardly.

The shutter or iris 86 in the orifice 12 is manipulated, as desired, to throttle the forward speed and or lift components of the vehicle without the need for manipulating the propeller motor 66. Increased safety is thus obtained since there would be less opportunity for motor failure due to excessive control. Steering, of course, is obtained by manipulation of the rudder and elevators in the conventional manner. Land movement of the vehicle is obtained by controlling both the forward speed and the volume of air in the stream through duct 56 so as to avoid lift. If high ground speeds are desired, the air through the chambers 46 and 48 may be directed horizontally rather than vertically from the slot 72.

Steering on the ground is effected in the conventional manner by steering the pivotal wheels 22 or, in the alternative, by use of the rudder 16. It is again noted that the turbine fan assembly 74 is freely rotatable and simply actuated by the movement of air through the duct 56. This construction gives rise to a most important advantage, namely; the virtual elimination of free fall and crash characteristics. Should, for some reason, the motor 66 fail while the vehicle is aloft and attempt to fall, air will continue to stream into duct 56. In fact, the faster the vehicle tends to fall, the faster is the air stream. This inrushing stream of air will activate the freely rotatable fans 76, providing the vertical lift, in the manner explained before, which is necessary to keep the vehicle afloat. Thus, even without power, the vehicle has a high glide characteristic which will permit the pilot to navigate to a safe landing under most, if not all adverse conditions.

The structure of the fuselage 10 itself gives rise to other important advantages. The sucking of air downwardly into chambers 46 and 48 from the upper foil surface 24 creates a partial vacuum above the vehicle while ejection of the same air through the longitudinal slots 72 creates a high pressure beneath the vehicle, thus resulting in an extremely high lift with little movement of air. Furthermore, the ejection of air vertically beneath the fuselage 10 creates a peripheral air curtain substantially around the entire under surface of the lower foil member 26, preventing the escape of the high pressure air laterally of the vehicle. As a result, a constant differential between the upper and lower foil members is maintained creating the high lift characteristic for sustained flight.

Another advantage of the present structure arises out of the forcibly vertically downward ejection of air through slot 72. This ejection eliminates what is known as "tip vortex" by reducing the buildup of violent eddy currents curling about the peripheral edge 34, reducing turbulence on the airfoil surfaces and eliminating drag on the "skin" of the fuselage.

It will be observed that the lift component of the vehicle is not dependent upon the forward speed of the vehicle nor merely the speed of the airstream through duct 56. The lift depends, of course, on the volume of air displaced through the upper duct chambers 46 and 48 which can be accomplished by providing high volume air through duct 56 by opening the shutter 86 in orifice 12. The larger the orifice 12 is opened, the greater will be the venturi effect of the air stream through duct 56 and thus the greater the lift provided by the fans 76.

Thus, slow forward takeoff and vertical takeoff can be accomplished at what would be commonly thought of as low taxi speeds. At high forward speeds or at high propeller speeds, it is not necessary that the volume of air moved through duct 56 be very high and consequently the shutter 86 should be narrowed. This also has an advantage, in that, the air drag of the vehicle and the horsepower required to operate the propeller 62 is reduced during cruising flight.

Still another advantage which, unlike the others, is not readily obvious from the structure described is obtained from the present invention. The elongated balloonlike structure of the fuselage 10 would normally appear to have a very low "aspect ratio," namely, the characteristic of the airfoil itself to sustain itself in flight. However, the combined phenomena obtained by its dihedral shape, its flat central upper section, its rounded corners and depending skirt, together with the ability to create a vacuum on its upper surface and pressure barriers on its undersurface, all combine to convert the fuselage into a "high aspect ratio" wing. This high aspect ratio results in an extremely high lift to power input function and consequently allows a very economical and low-powered vehicle.

The present vehicle has an advantage for land travel, in that, the flow of air through the duct chambers 46 and 48 creates a "ground effect" phenomena reducing even at low speed the friction between the wheel 22 and the ground on which it rides. It will also be observed that the fuselage 10 has the appearance of a conventional omnibus or elongated automobile. No wings extend laterally from the fuselage which are required to be folded or tied back in order to convert the vehicle for ground operation. No rotor blades extend outwardly of the fuselage and the vehicle takes up no more room on the ground than most conventional buses or trucks.

Various modifications can be made to the described structure. For example, the fans 76 may be provided with a mechanism for varying their pitch so as to increase or decrease their ability to suck air without changing the volume of speed of the airstream through the duct 56. The propeller 62 may be placed at the front of duct 56 if desired, however, this will tend to diminish the free flow of air into the duct in the event power is lost.

In the embodiment shown in FIGS. 1—4, the fans 76 are located substantially in the plane of the central flat section 28 of the upper foil member 24. While it may even be preferred, in order to increase the volume of air sucked into the fuselage to elevate the fans slightly above this plane, it may be desirous to place the fans 76 below the surface of the upper foil member 24 and to protect them against damage or accidental injury. In FIG. 5, there is shown a device comprising a cover member 88 having a series of circularly arranged louvres 90 which may be used to cover the fans and through which they may suck the air from the adjacent surface of the foil member 24. This is similar to boundary layer removal on conventional wing surfaces and has the advantage of reducing drag caused by open holes or protruding blades. The opening of the louvers 90 may be made adjustable to provide for increased operational flexibility.

It will now be appreciated that a simple vehicle is obtained devoid of complex control mechanisms, protruding wings and large power supply sources. There is only a central or primary power source for both land and air travel and it is simply a fan. The turbines providing vertical lift are each independent and do not require connecting gearing controls or other mechanisms to maintain uniform and conjoint operation. Because of the high lift ratio to power input provided by the single fan and freely rotating impellers, the vehicle is economical to operate. Needless to say, it is economical to build for virtually the same reasons.

It is to be understood that the embodiment herein shown is for illustration only and that the inventive principles described are not limited to the specific structure shown. Since such structure may be varied or modified without departing from these inventive principles, the scope of the present invention should be limited only by the appended claims.

I claim:

1. A heavier than air vehicle adapted for land and air travel comprising, an elongated fuselage, a first duct extending longitudinally therein having an opening at the front and an exit at the rear of said fuselage, means mounted within said first duct for creating an airstream axially therethrough, a second separate duct free of communication with and extending laterally about said first duct substantially along the length thereof and with an opening on the upper surface and an exit on the lower surface of said fuselage, means mounted within said second duct having actuating means located within said first duct and operable by said air stream therein for causing a flow of air from the upper surface of said fuselage through said second duct to be expelled from the exit in said lower surface, whereby the combined flow of air sustains said vehicle in movement.

2. The vehicle according to claim 1 including means for regulating the airstream through the first duct.

3. The vehicle according to claim 2 wherein the means for regulating the air flow includes shutter means located at the opening of the first duct to control the amount air flowing therein.

4. The vehicle according to claim 1 wherein the exit from the second duct comprises a slot within the lower surface of the fuselage, said slot extending along the periphery of said fuselage.

5. The vehicle according to claim 1 including a rudder and elevator for steering said fuselage in flight.

6. The vehicle according to claim 1 including steerable wheels for maneuvering said fuselage on the ground.

7. A heavier than air vehicle comprising, an elongated substantially hollow fuselage structure having openings in its upper and lower surfaces, permitting air to flow substantially vertically therethrough, fan means located within said fuselage for causing air to flow in the vertical direction, an air duct free of communication with said openings located within said fuselage and surrounded by said openings in the upper and lower surfaces and extending longitudinally therethrough, said duct having openings extending out of the front and rear of said fuselage to permit an airstream to flow axially therethrough, said fan means comprising an impeller blade, a freely rotatable shaft extending from said impeller blade into said duct and paddle means connected to said shaft whereby the airstream within said duct will cause rotation of said impeller blade and flow of air outwardly of said lower surface, thereby imparting vertical movement to said vehicle.

8. The vehicle according to claim 7 including propeller means located within the longitudinal duct and means for causing said propeller to create the airstream within said duct and imparting horizontal movement to the vehicle while simultaneously operating the fan means.

9. The vehicle according to claim 8 wherein the fuselage structure comprises a substantially transcendental ellipsoidal upper foil surface having a substantially flat central portion and a depending skirt end in a planar peripheral edge and a substantially flat lower foil surface joined along its periphery to said edge, whereby the fan means causes air to be sucked from the upper foil surface and expelled substantially vertically below said lower foil surface.

10. The vehicle according to claim 9 wherein the lower openings in the fuselage extend in a line substantially along the periphery thereof so that air expelled therefrom creates a barrier around the lower foil surface.

11. The vehicle according to claim 9 including a curved substantially horizontally extending partition mounted centrally of said lower foil surface within said fuselage to form said longitudinal duct and said upper and lower foil surface at the front and rear openings therein.

12. The vehicle according to claim 11 including a variable orifice located within said front fuselage opening to regulate the flow of the airstream through the longitudinal duct.

13. The vehicle according to claim 11 including vertical converging wall members within the longitudinal duct to provide a venturi effect on the airstream flowing therein.

14. The vehicle according to claim 13 including a second partition within said fuselage, said second partition extending longitudinally along the center line of the upper foil surface to divide said fuselage in two sections, each section having openings in their upper and lower surfaces and fan means for the vertical flow of air therethrough.

15. The vehicle according to claim 14 wherein said fuselage is provided with a dihedral configuration along the center line thereof.

16. The vehicle according to claim 15 wherein a plurality of fan means are employed, said fans being disposed in uniformly spaced rows on opposite sides of the central line of the upper foil member, said impeller blade being disposed substantially in the plane of the central portion of the upper foil surface.

17. The vehicle according to claim 15 including a louvered cover disposed over said impeller blade to effect greater flow of air along the boundary layer of the foil surface.

18. A heavier than air vehicle comprising an elongated substantially hollow fuselage having an upper foil surface and lower foil surface spaced therefrom, said upper foil surface defining a substantially flat longitudinal central portion and a peripheral skirt depending therefrom, a partition substantially parallel to said upper foil located between said upper and lower foils to provide an interior chamber extending longitudinally of said fuselage and an exterior chamber surrounding said interior chamber, said chambers being separated from communication with each other by said partition opening in the forward and rear end of said interior chamber to form a longitudinal duct therefrom, and openings in the upper and lower foils in said exterior chamber to form a vertical duct therefrom, fan means located in the opening of said upper foil, said fan mounted on a shaft extending into said longitudinal duct, and paddle means secured to said shaft within said longitudinal duct whereby air flow through said longitudinal duct causes rotation of said fan means and simultaneous airflow in said vertical duct.

19. The vehicle according to claim 18 wherein said upper foil is provided with a plurality of openings, each of which having a fan means having a shaft and paddle means extending within said longitudinal duct.

20. The vehicle according to claim 19 wherein said opening in said lower foil comprises a continuous opening along each of the longitudinal peripheral side edges of said fuselage.

21. The vehicle according to claim 20 wherein said longitudinal duct is provided with a fan means and motor means for rotating said fan means to provide for an axial flow of air therethrough.